US012566396B2

(12) United States Patent
Saeki

(10) Patent No.: US 12,566,396 B2
(45) Date of Patent: Mar. 3, 2026

(54) FIXING BELT AND FIXING DEVICE

(71) Applicant: TOSHIBA TEC KABUSHIKI KAISHA, Tokyo (JP)

(72) Inventor: Ryota Saeki, Sunto (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 373 days.

(21) Appl. No.: 18/303,100

(22) Filed: Apr. 19, 2023

(65) Prior Publication Data

US 2023/0251595 A1 Aug. 10, 2023

Related U.S. Application Data

(63) Continuation of application No. 17/472,080, filed on Sep. 10, 2021, now Pat. No. 11,662,677, which is a continuation of application No. 16/925,077, filed on Jul. 9, 2020, now Pat. No. 11,143,995.

(30) Foreign Application Priority Data

Nov. 22, 2019 (JP) ................................ 2019-211222

(51) Int. Cl.
*G03G 15/20* (2006.01)

(52) U.S. Cl.
CPC ....... *G03G 15/2053* (2013.01); *G03G 15/206* (2013.01); *G03G 15/2064* (2013.01); *G03G 2215/2038* (2013.01)

(58) Field of Classification Search
CPC ........... G03G 15/2038; G03G 15/2053; G03G 15/206; G03G 15/2064
See application file for complete search history.

(56) References Cited

U.S. PATENT DOCUMENTS

| | | | | |
|---|---|---|---|---|
| 6,201,945 | B1 | 3/2001 | Schlueter et al. | |
| 6,526,250 | B1 | 2/2003 | Usui et al. | |
| 9,201,366 | B2 * | 12/2015 | Creteau | G03G 15/2064 |
| 9,298,145 | B2 | 3/2016 | Ishikuro | |
| 2006/0056891 | A1 * | 3/2006 | Hashiguchi | G03G 15/2057 399/329 |
| 2006/0127144 | A1 | 6/2006 | Watanabe | |

(Continued)

FOREIGN PATENT DOCUMENTS

| | | | |
|---|---|---|---|
| CN | 102636979 | A | 8/2012 |
| CN | 102799094 | A | 11/2012 |

(Continued)

OTHER PUBLICATIONS

Extended European Search Report dated May 3, 2021 issued in European Patent Application No. 20195375.9, nine (9) pages.

(Continued)

*Primary Examiner* — Gregory H Curran
(74) *Attorney, Agent, or Firm* — FOLEY & LARDNER LLP

(57) ABSTRACT

A fixing device includes a fixing belt formed of a tubular film, a heater configured to heat the fixing belt and including an insulating layer, a roller positioned such that the fixing belt extends between the roller the heater, and a heat conductor in contact with the heater. The heater is positioned such that the insulating layer of the heater extends between the fixing belt and the heat conductor to prevent the heat conductor from contacting the tubular film.

13 Claims, 6 Drawing Sheets

(56) References Cited

U.S. PATENT DOCUMENTS

| | | | | |
|---|---|---|---|---|
| 2007/0181251 | A1 | 8/2007 | Ikeda et al. | |
| 2010/0239338 | A1 | 9/2010 | Takahashi | |
| 2016/0132006 | A1* | 5/2016 | Narahara | G03G 15/2053 399/329 |
| 2019/0212677 | A1 | 7/2019 | Kikuchi | |
| 2019/0339638 | A1 | 11/2019 | Kinukawa et al. | |
| 2019/0377287 | A1 | 12/2019 | Hasegawa et al. | |

FOREIGN PATENT DOCUMENTS

| | | | |
|---|---|---|---|
| CN | 110032050 | A | 7/2019 |
| JP | 2018-146895 | A | 9/2018 |
| JP | 2019-124714 | A | 7/2019 |

OTHER PUBLICATIONS

Non-Final Office Action on U.S. Appl. No. 16/925,077 Dtd Dec. 24, 2020.
Non-Final Office Action on U.S. Appl. No. 17/472,080 Dtd Sep. 22, 2022.
Notice of Allowance issued in U.S. Appl. No. 16/925,077 Dtd Jun. 11, 2021.
Notice of Allowance on U.S. Appl. No. 17/472,080 Dtd Jan. 20, 2023.
Supplemental Notice of Allowability issued in U.S. Appl. No. 16/925,077 Dtd Jul. 30, 2021.
Second Office Action dated Jan. 8, 2025 issued in CN Application No. 202010936371.6, with English translation, 13 pages.
Office Action for CN Application No. 202010936371.6, dated Jul. 3, 2024, pp. 1-6.

* cited by examiner

FIG. 9

| SURFACE RESISTIVITY OF FIXING FILM [LOGΩ/sq.] | VOLUME RESISTIVITY OF FIXING FILM [LOGΩ・cm] | WITHSTAND VOLTAGE [kV] | DETERMINATION RESULT |
|---|---|---|---|
| 6.26 | 13.20 | 0.5 | NG |
| 7.05 | 12.71 | 3.8 | OK |
| 8.37 | 13.34 | 9 OR MORE | OK |
| 9.87 | 13.27 | 9 OR MORE | OK |
| 12.51 | 13.95 | 9 OR MORE | OK |
| 15 OR MORE (MEASUREMENT LIMIT) | 14.80 | 9 OR MORE | OK |

FIG. 10

| SURFACE RESISTIVITY OF FIXING FILM [LOGΩ/sq.] | VOLUME RESISTIVITY OF FIXING FILM [LOGΩ・cm] | STATIC ELECTRICITY AMOUNT ON SURFACE OF FIXING FILM [kV] | DETERMINATION RESULT |
|---|---|---|---|
| 6.26 | 13.20 | 0 | OK |
| 7.05 | 12.71 | 0.15 | OK |
| 8.37 | 13.34 | 0.32 | OK |
| 9.87 | 13.27 | 0.27 | OK |
| 12.51 | 13.95 | 1.18 | (OK) |
| 15 OR MORE (MEASUREMENT LIMIT) | 14.80 | 4.46 | NG |

FIG. 11

| PRESENCE OR ABSENCE OF ADDITION OF CONDUCTIVE MATERIAL (O YES / × NO) | | | SURFACE RESISTIVITY OF FIXING FILM [LOGΩ/sq.] | VOLUME RESISTIVITY OF FIXING FILM [LOGΩ・cm] | STATIC ELECTRICITY AMOUNT ON SURFACE OF FIXING FILM [kV] | DETERMI -NATION RESULT |
|---|---|---|---|---|---|---|
| Si RUBBER | PRIMER | PFA TUBE | | | | |
| × | ○ | × | 14.94 | 14.5 | 1.44 | (OK) |
| ○ | ○ | × | 13.14 | 14.43 | 0.08 | OK |
| ○ | ○ | ○ | 13.19 | 14.09 | 0.03 | OK |
| ○ | ○ | × | 13.02 | 14.24 | 0.21 | OK |
| ○ | × | × | 12.39 | 14.26 | 0.11 | OK |

FIXING BELT AND FIXING DEVICE

CROSS-REFERENCE TO RELATED APPLICATIONS

This application is a continuation of U.S. patent application Ser. No. 17/472,080, filed Sep. 10, 2021, which is a continuation of U.S. patent application Ser. No. 16/925,077, filed Jul. 9, 2020, which is based upon and claims the benefit of priority from Japanese Patent Application No. 2019-211222, filed Nov. 22, 2019, the entire contents of which are incorporated herein by reference.

FIELD

Embodiments described herein relate generally to a fixing belt and a fixing device.

BACKGROUND

In the related art, there is a fixing device that heats a fixing belt from the inside of a tubular fixing belt with a planar heater. In such a fixing device, as the base material of the fixing belt, a metal-based material is often used for the high-speed device, and a non-metal-based material is often used for the medium-speed device and the low-speed device. The reason for this is that more heat is taken by the paper in the high-speed device, and the temperature of the fixing belt cannot be maintained unless the fixing belt has a certain heat capacity. In terms of cost, it is difficult to use an expensive metal fixing belt for a low-price low-speed device. Therefore, if there is no problem with heat capacity, it is desirable to use a non-metal fixing belt.

DESCRIPTION OF THE DRAWINGS

FIG. 9 is a diagram showing a detailed configuration example of a fixing device according to some embodiments;

FIG. 10 is a flowchart showing a flow of state control processing according to some embodiments; and FIG. 11 is a flowchart showing a flow of state control processing according to some embodiments.

DETAILED DESCRIPTION

When a non-metal fixing belt is used, static electricity generated by sliding of the fixing belt and the heater may adversely affect the operation of the fixing device. Specifically, the surface of the fixing belt is charged, which may cause a problem that an unfixed toner image that is electrically charged is disturbed. As a measure against this, it is general to use a resin having conductivity as a resin forming the base material of the fixing belt. However, with this measure, when the heating surface of the planar heater is in direct contact with the inside of the fixing belt, it may not be possible to sufficiently secure the withstand voltage between the fixing belt and the heater.

The problem to be solved by the present disclosure is to provide a fixing belt and a fixing device that can achieve both the suppression of the charging of the fixing belt and the securing of the withstand voltage of secondary parts of the fixing belt, and a heater.

In general, according to at least one embodiment, there is provided a fixing belt which is a tubular endless belt including a base layer, an elastic layer, and a release layer in order from an inner peripheral side. A surface resistivity of the fixing belt measured from the base layer side is 7 [LOG Ω/sq.] or more and 10 [LOG Ω/sq.] or less.

Hereinafter, a fixing belt and a fixing device according to the embodiments will be described with reference to the drawings.

First Embodiment

Figure 1:
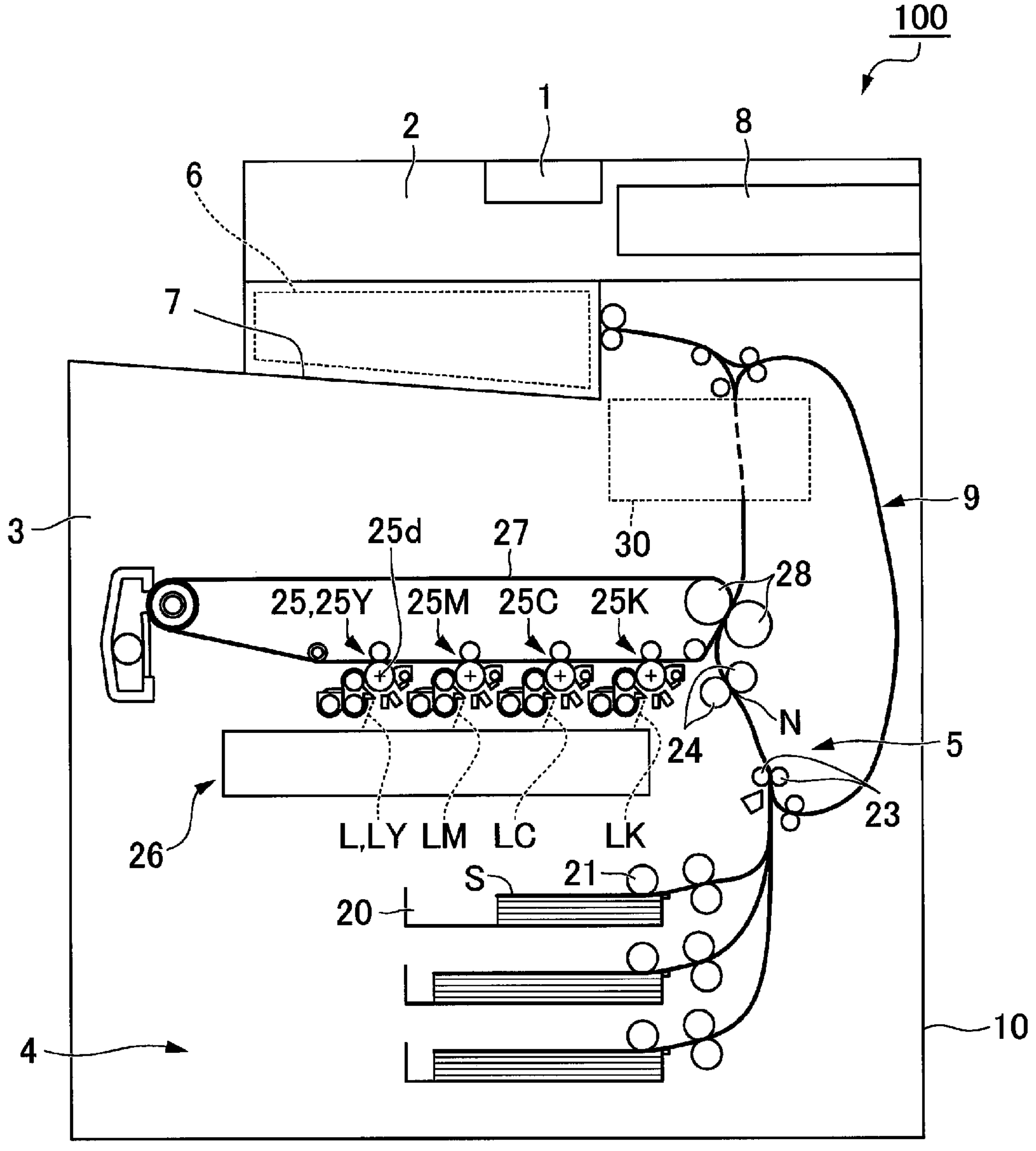
FIG. 1 is a diagram showing an outline of a configuration of an image forming apparatus according to some embodiments.

FIG. 1 is a diagram showing an outline of a configuration of an image forming apparatus according to a first embodiment. An image forming apparatus 100 according to the first embodiment is, for example, a multifunction peripheral. The image forming apparatus 100 includes a housing 10, a display 1, a scanner unit 2, an image forming unit 3, a sheet supply (supplier) unit 4, a conveyance unit (conveyor) 5, a paper discharge tray 7, a reversing unit (reverser) 9, a control panel 8, and a control unit 6 (e.g., controller). The image forming unit 3 may be a device that fixes a toner image or an inkjet device.

The image forming apparatus 100 forms an image on a sheet S with a developer such as a toner. The sheet S is, for example, paper or label paper. The sheet S may be any sheet as long as the image forming apparatus 100 can form an image on the surface thereof.

The housing 10 forms the outer shape of the image forming apparatus 100. The display 1 is an image display device such as a liquid crystal display or an organic electro luminescence (EL) display. The display 1 displays various information regarding the image forming apparatus 100.

The scanner unit 2 reads image information of an object to be read based on brightness and darkness of light. The scanner unit 2 records the read image information. The scanner unit 2 outputs the generated image information to the image forming unit 3. The recorded image information may be transmitted to another information processing device via a network.

The image forming unit 3 forms an output image (hereinafter, referred to as a toner image) with a recording material such as a toner, based on the image information received from the scanner unit 2 or image information received from another device. The image forming unit 3 transfers the toner image to the surface of the sheet S. The image forming unit 3 heats and presses the toner image on the surface of the sheet S to fix the toner image to the sheet S. The details of the image forming unit 3 will be described later. The sheet S may be a sheet supplied by the sheet supply unit 4 or may be a manually fed sheet.

The sheet supply unit 4 supplies the sheets S one by one to the conveyance unit 5 at the timing when the image forming unit 3 forms a toner image. The sheet supply unit 4 includes a sheet storage unit 20 and a pickup roller 21.

The sheet storage unit 20 stores sheets S of a predetermined size and type. The pickup roller 21 picks up the sheets S one by one from the sheet storage unit 20. The pickup roller 21 supplies the picked-up sheet S to the conveyance unit 5.

The conveyance unit 5 conveys the sheet S supplied from the sheet supply unit 4 to the image forming unit 3. The conveyance unit 5 includes conveyance rollers 23 and registration rollers 24. The conveyance rollers 23 convey the sheet S supplied from the pickup roller 21 to the registration rollers 24. The conveyance rollers 23 abut the leading end of the sheet S in the conveyance direction against a nip N of the registration rollers 24.

The registration rollers 24 adjust the position of the leading end of the sheet S in the conveyance direction by bending the sheet S at the nip N. The registration rollers 24 convey the sheet S at the timing when the image forming unit 3 transfers the toner image to the sheet S.

The image forming unit 3 will be described. The image forming unit 3 includes a plurality of image forming units 25, a laser scanning unit 26, an intermediate transfer belt 27, a transfer unit 28, and a fixing device 30. The image forming unit 25 includes a photosensitive drum 25*d*. The image forming unit 25 forms a toner image on the photosensitive drum 25*d* according to image information from the scanner unit 2 or the outside. A plurality of image forming units 25Y, 25M, 25C, and 25K form toner images of yellow, magenta, cyan, and black toners, respectively.

A charger, a developing device (e.g., a developer), and the like are arranged around the photosensitive drum 25*d*. The charger charges the surface of the photosensitive drum 25*d*. The developing device contains a developer containing yellow, magenta, cyan, and black toners. The developing device develops the electrostatic latent image on the photosensitive drum 25*d*. As a result, toner images of the toners of the respective colors are formed on the photosensitive drum 25*d*.

The laser scanning unit 26 scans the charged photosensitive drum 25*d* with laser light L to expose the photosensitive drum 25*d*. The laser scanning unit 26 exposes the photosensitive drums 25*d* of the image forming units 25Y, 25M, 25C, and 25K of the respective colors with different laser beams LY, LM, LC, and LK. As a result, the laser scanning unit 26 forms an electrostatic latent image on the photosensitive drum 25*d*.

The toner image on the surface of the photosensitive drum 25*d* is primarily transferred onto the intermediate transfer belt 27. The transfer unit 28 transfers the toner image primarily transferred onto the intermediate transfer belt 27 to the surface of the sheet S at a secondary transfer position. The fixing device 30 heats and presses the toner image transferred to the sheet S to fix the toner image to the sheet S. The details of the fixing device 30 will be described later.

The reversing unit 9 reverses the sheet S to form an image on the back surface of the sheet S. The reversing unit 9 reverses the sheet S discharged from the fixing device 30 by switchback. The reversing unit 9 conveys the reversed sheet S toward the registration rollers 24.

The sheet discharge tray 7 places the sheet S which is discharged with an image formed thereon. The control panel 8 includes a plurality of buttons. The control panel 8 receives user operations. The control panel 8 outputs a signal according to the operation performed by the user to the controller 6 of the image forming apparatus 100. The display 1 and the control panel 8 may be configured as an integrated touch panel. The controller 6 controls each unit of the image forming apparatus 100. The details of the controller 6 will be described later.

Figure 2:
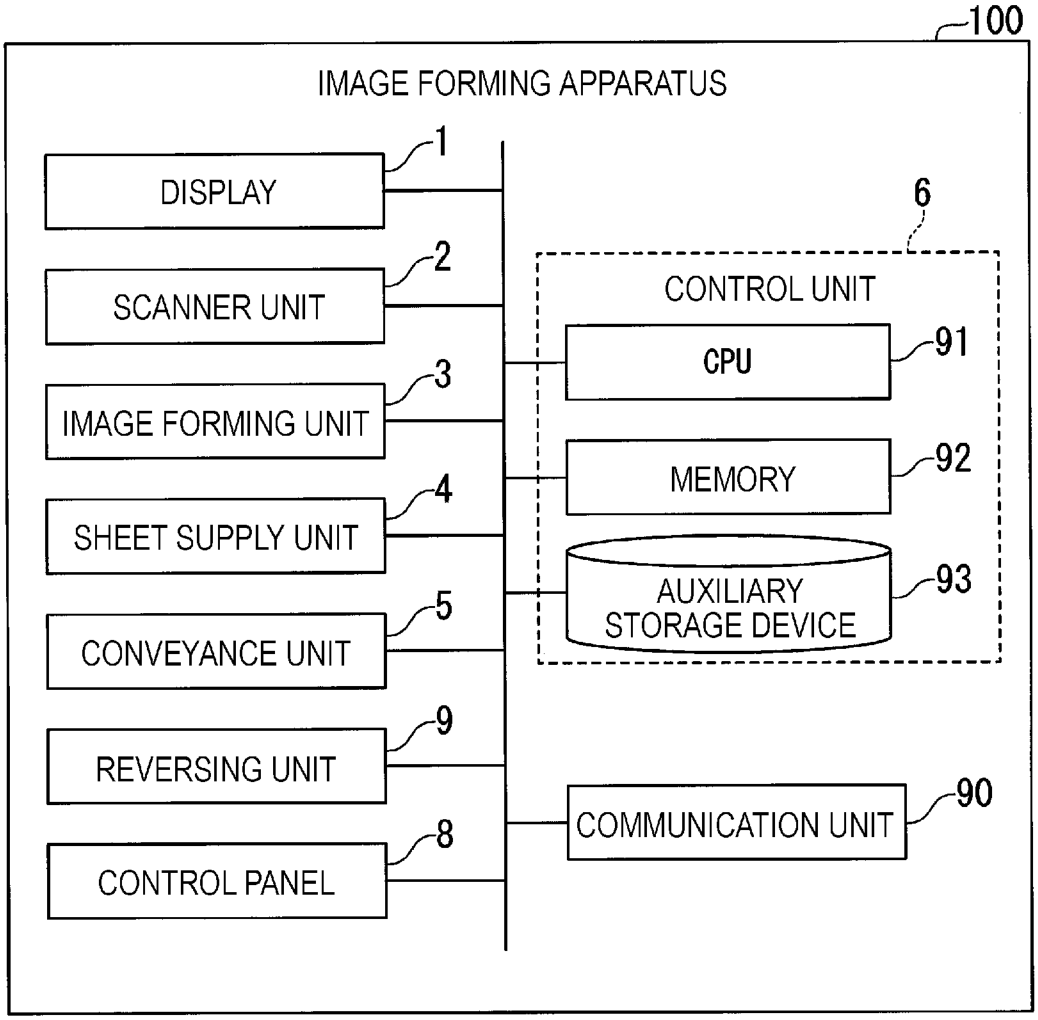
FIG. 2 is a diagram showing a specific example of the hardware configuration of the image forming apparatus according to some embodiments.

FIG. 2 is a diagram showing a specific example of the hardware configuration of the image forming apparatus 100 according to the first embodiment. The image forming apparatus 100 includes a central processing unit (CPU) 91, a memory 92, an auxiliary storage device 93, and the like, which are connected by a bus, and executes a program. The image forming apparatus 100 functions as an apparatus including the scanner unit 2, the image forming unit 3, the sheet supply unit 4, the conveyance unit 5, the reversing unit 9, the control panel 8, and a communication unit 90 by executing the program. All or some of the functions of the image forming apparatus 100 may be realized using hardware such as an application specific integrated circuit (ASIC), a programmable logic device (PLD), and a field programmable gate array (FPGA). The program may be recorded in a computer-readable recording medium. The computer-readable recording medium is, for example, a portable medium such as a flexible disk, a magneto-optical disk, a ROM, and a CD-ROM, or a storage device such as a hard disk built in a computer system. The program may be transmitted via a telecommunication line, for example.

The CPU 91 functions as the controller 6 by executing the programs stored in the memory 92 and the auxiliary storage device 93. The controller 6 controls the operation of each functional unit of the image forming apparatus 100. The auxiliary storage device 93 is configured using a storage device such as a magnetic hard disk device or a semiconductor storage device. The auxiliary storage device 93 stores various information regarding the image forming apparatus 100. The communication unit 90 includes a communication interface for connecting the own device to an external device. The communication unit 90 communicates with an external device via a communication interface.

Figure 3:
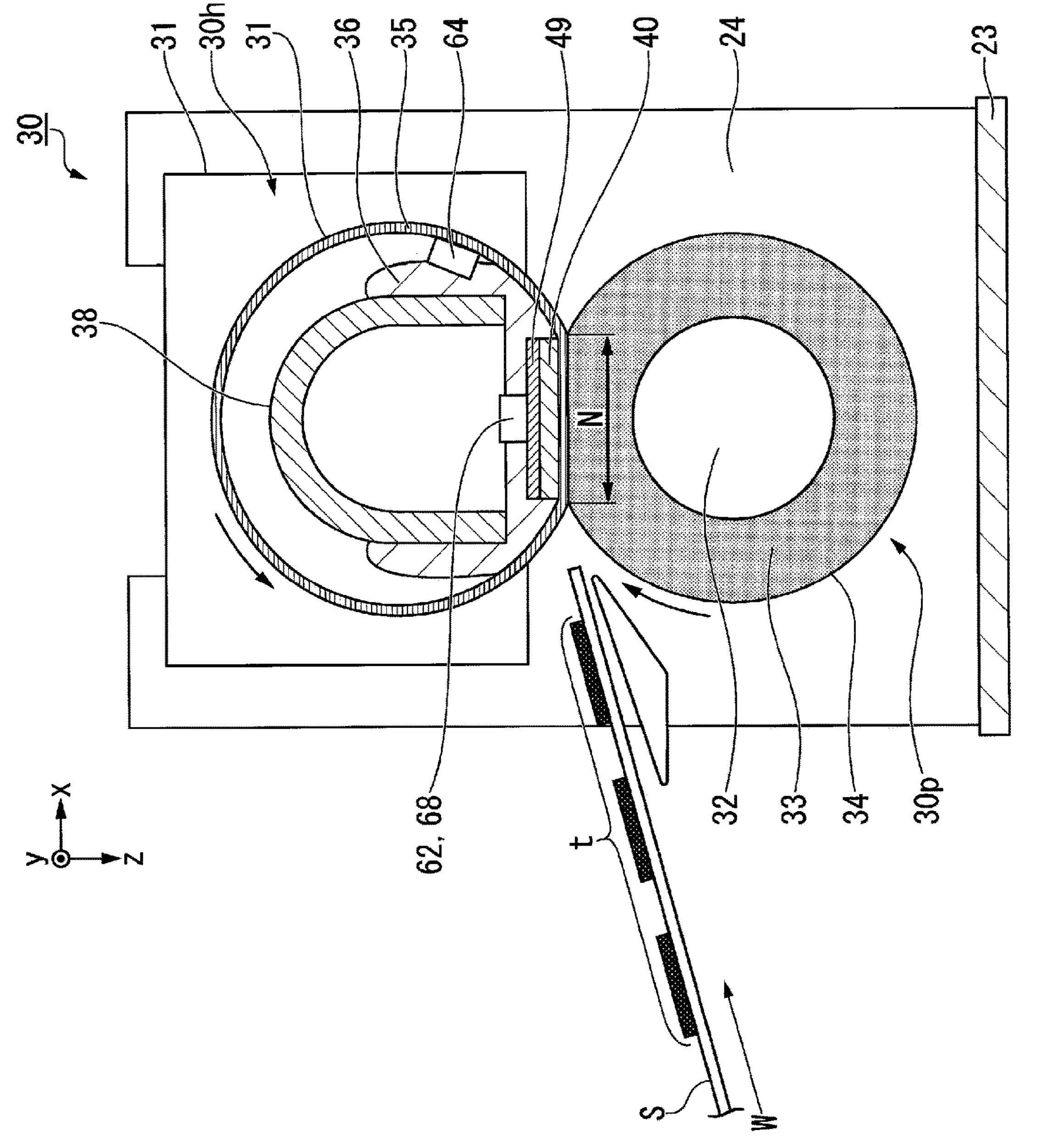
FIG. 3 is a front sectional view of a heating device according to some embodiments.

The fixing device 30 will be described in detail. FIG. 3 is a front sectional view of a heating device according to the first embodiment. The heating device according to the first embodiment is the fixing device 30. The fixing device 30 includes a pressure roller 30*p* and a film unit 30*h*.

The pressure roller 30*p* forms the nip N with the film unit 30*h*. The pressure roller 30*p* presses a toner image t on the sheet S that entered the nip N. The pressure roller 30*p* rotates to convey the sheet S. The pressure roller 30*p* includes a cored bar 32, an elastic layer 33, and a release layer 34. As described above, the pressure roller 30*p* can press the surface of a fixing film 35 (e.g., fixing belt) and can be rotationally driven.

The cored bar 32 is formed in a cylindrical shape from a metal material such as stainless steel. Both axial ends of the cored bar 32 are rotatably supported. The cored bar 32 is rotationally driven by a motor (not shown). The cored bar 32 contacts a cam member (not shown). The cam member rotates to move the cored bar 32 toward and away from the film unit 30*h*.

The elastic layer 33 is formed of an elastic material such as silicone rubber. The elastic layer 33 is formed on the outer peripheral surface of the cored bar 32 with a constant thickness. The release layer 34 is formed of a resin material such as PFA (tetrafluoroethylene/perfluoroalkyl vinyl ether copolymer). The release layer is formed on the outer peripheral surface of the elastic layer 33. The hardness of the outer peripheral surface of the pressure roller 30*p* is preferably 40° to 70° under a load of 9.8 N using an ASKER-C hardness meter. Thereby, the area of the nip N and the durability of the pressure roller 30*p* are ensured.

The pressure roller 30*p* can approach and separate from the film unit 30*h* by the rotation of the cam member. When the pressure roller 30*p* is brought close to the film unit 30*h* and pressed by the pressure spring, the nip N is formed. On the other hand, when the sheet S is jammed in the fixing device 30, the sheet S can be removed by separating the pressure roller 30*p* from the film unit 30*h*. Further, when the fixing film 35 is not rotating, such as during sleep, by separating the pressure roller 30*p* from the film unit 30*h*, plastic deformation of the fixing film 35 is prevented.

The pressure roller 30*p* is rotationally driven by a motor. When the pressure roller 30*p* rotates with the nip N formed, the fixing film 35 of the film unit 30*h* is driven to rotate. The pressure roller 30*p* conveys the sheet S in the conveyance direction W by rotating in a state where the sheet S is arranged in the nip N.

The film unit 30*h* heats the toner image t on the sheet S that entered the nip N. The film unit 30*h* includes the fixing film 35, a heater unit 40, a heat conducting member 49, a support member 36, a stay 38, a heater thermometer 62, a thermostat 68, and a film thermometer 64.

The fixing film 35 is formed in a tubular shape. The fixing film 35 includes a base layer, an elastic layer, and a release layer in order from the inner peripheral side. The base layer is formed in a tubular shape. The elastic layer is laminated and arranged on the outer peripheral surface of the base layer. The elastic layer is formed of an elastic material such as rubber. The release layer is laminated and arranged on the outer peripheral surface of the elastic layer. The release layer is formed of a material such as PFA resin.

Figure 4:
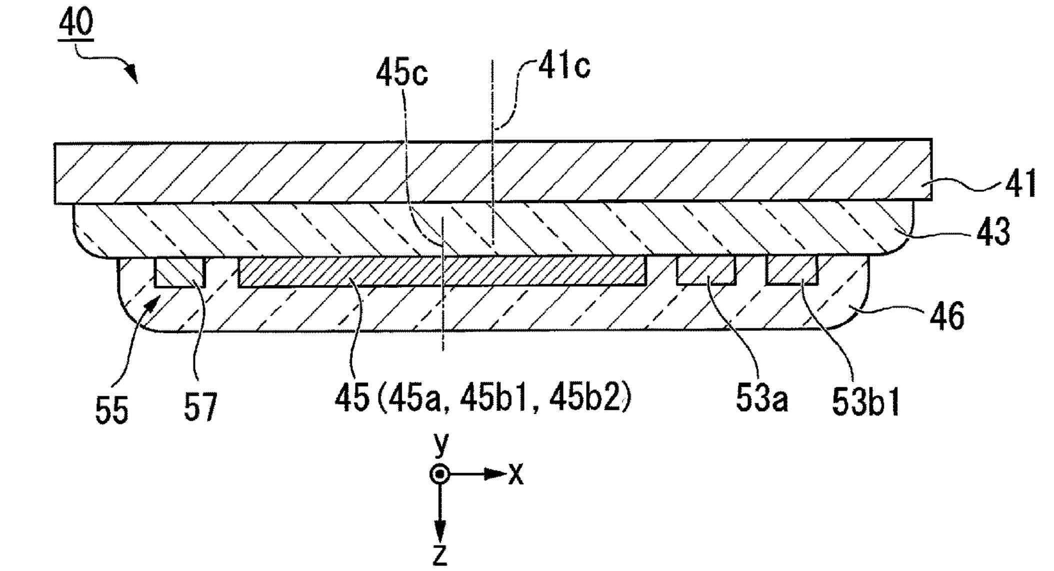
FIG. 4 is a front sectional view of a heater unit according to some embodiments.
Figure 5:
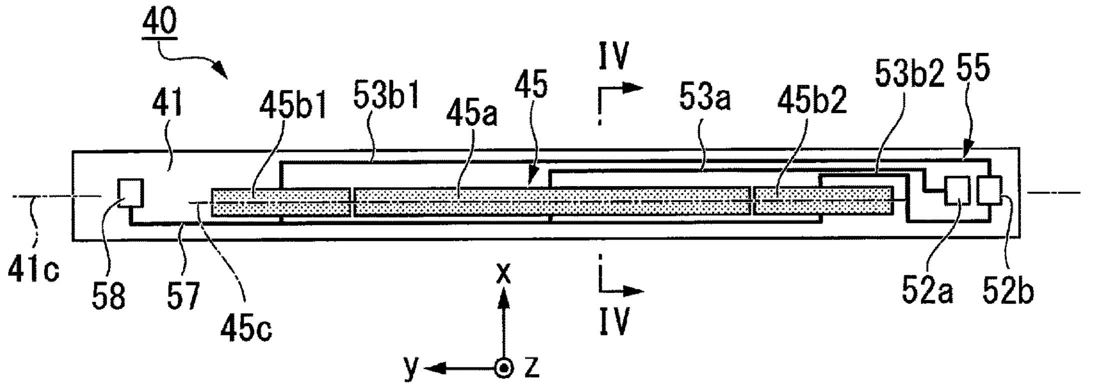
FIG. 5 is a bottom view of the heater unit according to some embodiments.

FIG. 4 is a front sectional view of the heater unit taken along line IV-IV in FIG. 5. FIG. 5 is a bottom view of the heater unit (view seen from the +z direction). The heater unit 40 includes a substrate (heating element substrate) 41, a heating element set 45, and a wiring set 55.

The substrate 41 is formed of a metal material such as stainless steel or a ceramic material such as aluminum nitride. The substrate 41 is formed in a long and thin rectangular plate shape (a planar shape). The substrate 41 is arranged inside the fixing film 35 in the radial direction. In the substrate 41, the axial direction of the fixing film 35 is the longitudinal direction.

In the present disclosure, the x direction, the y direction, and the z direction are defined as follows. The y direction is the longitudinal direction of the substrate 41. The y direction is parallel to the width direction of the fixing film 35. As will be described later, the +y direction is a direction from a central heating element 45*a* toward a first end heating element 45*b*1. The x direction is the lateral direction of the substrate 41, and the +x direction is the conveyance direction (downstream direction) of the sheet S. The z direction is the normal direction of the substrate 41, and the +z direction is the direction in which the heating element set 45 is arranged with respect to the substrate 41. An insulating layer 43 made of a glass material or the like is formed on the surface of the substrate 41 in the +z direction.

The heating element set 45 is arranged on the substrate 41. As shown in FIG. 4, the heating element set 45 is formed on the surface of the insulating layer 43 in the +z direction. The heating element set 45 is formed of a TCR (temperature coefficient of resistance) material. For example, the heating element set 45 is formed of silver/palladium alloy or the like. The outer shape of the heating element set 45 is formed in a rectangular shape with the y direction as the longitudinal direction and the x direction as the lateral direction.

As shown in FIG. 5, the heating element set 45 includes a first end heating element 45*b*1, a central heating element 45*a*, and a second end heating element 45*b*2 arranged side by side in the y direction. The central heating element 45*a* is arranged at the central portion of the heating element set 45 in the y direction. The central heating element 45*a* may be configured by combining a plurality of small heating elements arranged side by side in the y direction. The first end heating element 45*b*1 is arranged in the +y direction of the central heating element 45*a* and at the end of the heating element set 45 in the +y direction. The second end heating element 45*b*2 is arranged in the −y direction of the central heating element 45*a* and at the end of the heating element set 45 in the −y direction. The boundary line between the central heating element 45*a* and the first end heating element 45*b*1 may be arranged in parallel with the x direction or may be arranged intersecting with the x direction. The same applies to the boundary line between the central heating element 45*a* and the second end heating element 45*b*2.

The heating element set 45 generates heat by the power supply. The electric resistance value of the central heating element 45*a* is smaller than the electric resistance values of the first end heating element 45*b*1 and the second end heating element 45*b*2. The sheet S having a small width in the y direction passes through the central portion of the fixing device 30 in the y direction. In this case, the controller 6 causes only the central heating element 45*a* to generate heat. On the other hand, when the sheet S has a large width in the y direction, the controller 6 causes the entire heating element set 45 to generate heat. Therefore, the central heating element 45*a*, and the first end heating element 45*b*1 and the second end heating element 45*b*2 are controlled to generate heat independently of each other. Further, the first end heating element 45*b*1 and the second end heating element 45*b*2 are similarly controlled to generate heat.

The wiring set 55 is formed of a metal material such as silver. The wiring set 55 includes a central contact 52*a*, a central wiring 53*a*, an end contact 52*b*, a first end wiring 53*b*1, a second end wiring 53*b*2, a common contact 58, and a common wiring 57.

The central contact 52*a* is arranged in the −y direction of the heating element set 45. The central wiring 53*a* is arranged in the +x direction of the heating element set 45. The central wiring 53*a* connects the +x direction end side of the central heating element 45*a* and the central contact 52*a* to each other.

The end contact 52*b* is arranged in the −y direction of the center contact 52*a*. The first end wiring 53*b*1 is arranged in the +x direction of the heating element set 45 and in the +x direction of the central wiring 53*a*. The first end wiring 53*b*1 connects the +x direction end side of the first end heating element 45*b*1 and the +x direction end of the end contact 52*b* to each other. The second end wiring 53*b*2 is arranged in the +x direction of the heating element set 45 and in the −x direction of the central wiring 53*a*. The second end wiring 53*b*2 connects the +x direction end side of the second end heating element 45*b*2 and the −x direction end of the end contact 52*b* to each other.

The common contact 58 is arranged in the +y direction of the heating element set 45. The common wiring 57 is arranged in the −x direction of the heating element set 45. The common wiring 57 connects the common contact 58 to the −x direction end sides of the central heating element 45*a*, the first end heating element 45*b*1, and the second end heating element 45*b*2.

In this way, the second end wiring 53*b*2, the central wiring 53*a*, and the first end wiring 53*b*1 are arranged in the +x direction of the heating element set 45. On the other hand, only the common wiring 57 is arranged in the −x direction of the heating element set 45. Therefore, a center 45*c* of the heating element set 45 in the x direction is arranged in the −x direction with respect to a center 41*c* of the substrate 41 in the x direction.

As shown in FIG. 3, a straight line CL connecting the center pc of the pressure roller 30*p* and the center hc of the film unit 30*h* is defined. The center 41*c* of the substrate 41 in the x direction is arranged in the +x direction from the straight line CL. As a result, the substrate 41 extends in the +x direction of the nip N, so that the sheet S that passed through the nip N is easily separated from the film unit 30*h*.

The center 45*c* of the heating element set 45 in the x direction is arranged on the straight line CL. The heating element set 45 is entirely included in the region of the nip N and is arranged at the center of the nip N. As a result, the heat distribution in the nip N becomes uniform, and the sheet S passing through the nip N is evenly heated.

As shown in FIG. 4, the heating element set 45 and the wiring set 55 are formed on the surface of the insulating layer 43 in the +z direction. A protective layer 46 is formed of a glass material or the like to cover the heating element set 45 and the wiring set 55. The protective layer 46 improves the slidability between the heater unit 40 and the fixing film 35.

As shown in FIG. 3, the heater unit 40 is arranged inside the fixing film 35. A lubricant (not shown) is applied to the inner peripheral surface of the fixing film 35. The heater unit 40 contacts the inner peripheral surface of the fixing film 35 via the lubricant. When the heater unit 40 generates heat, the viscosity of the lubricant decreases. Thereby, the slidability between the heater unit 40 and the fixing film 35 is ensured. Thus, the fixing film 35 is a strip-shaped thin film that slides on the surface of the heater unit 40 while being in contact with the heater unit 40 on one surface.

The heat conducting member 49 is formed of a metal material having a high heat conductivity such as copper. The outer shape of the heat conducting member 49 is the same as the outer shape of the substrate 41 of the heater unit 40. The heat conducting member 49 is arranged in contact with the surface of the heater unit 40 in the −z direction.

The support member 36 is formed of a resin material such as liquid crystal polymer. The support member 36 is arranged to cover the −z direction and both sides in the x direction of the heater unit 40. The support member 36 supports the heater unit 40 via the heat conducting member 49. Round chamfers are formed at both ends of the support member 36 in the x direction. The support member 36 supports the inner peripheral surface of the fixing film 35 at both ends of the heater unit 40 in the x direction.

When the sheet S passing through the fixing device 30 is heated, a temperature distribution is generated in the heater unit 40 according to the size of the sheet S. When the heater unit 40 has a high temperature locally, the temperature thereof may exceed the upper temperature limit of the support member 36 formed of a resin material. The heat conducting member 49 averages the temperature distribution of the heater unit 40. Thus, the heat resistance of the support member 36 is ensured.

Figure 6:
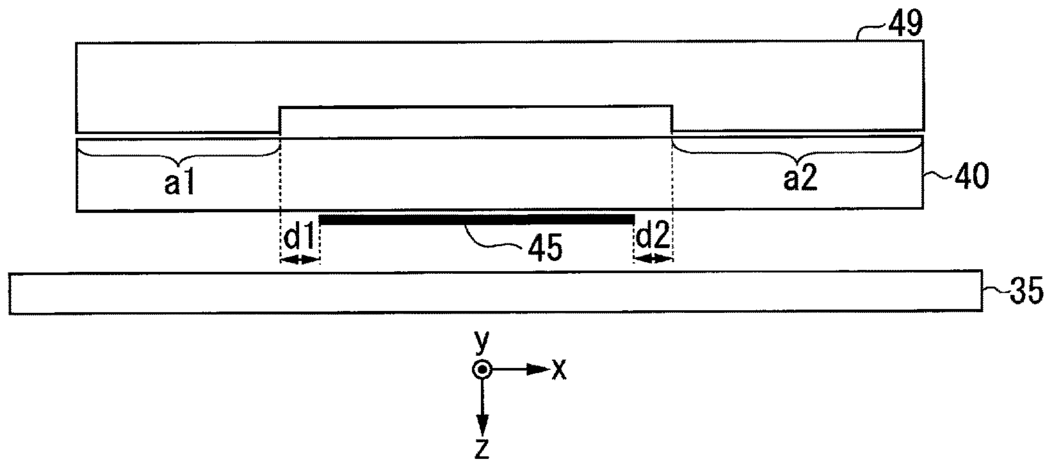
FIG. 6 is a front sectional view of a heat conducting member, the heater unit, and a tubular belt according to some embodiments.

FIG. 6 is a front sectional view of the heat conducting member, the heater unit, and the tubular belt. The heat conducting member 49 is arranged on the surface of the heater unit 40 which is not in contact with the fixing film 35. Further, the heat conducting member 49 is configured so as not to come into contact with the heater unit 40 at a position where the heat generation distribution in the heater unit 40 has a peak. Specifically, as shown in FIG. 6, the heater unit 40 and the heat conducting member 49 are in contact with each other in the regions a1 and a2. Then, the non-contact portion forms a groove portion of the heat conducting member 49. The width of the groove portion is set to be wider than the width of the heating element set 45 of the heater unit 40 by a length d1 and a length d2. For example, the width of the heating element set 45 of the heater unit 40 is 4.5 to 4.9 [mm], and the width of the groove portion is about 5 [mm].

The stay 38 shown in FIG. 3 is formed of a steel plate material or the like. A cross section of the stay 38 perpendicular to the y direction is formed in a U shape. The stay 38 is mounted in the −z direction of the support member 36 so that the U-shaped opening is closed by the support member 36. The stay 38 extends in the y direction. Both ends of the stay 38 in the y direction are fixed to the housing of the image forming apparatus 100. As a result, the film unit 30*h* is supported by the image forming apparatus 100. The stay 38 improves the bending rigidity of the film unit 30*h*. A flange 31 that restricts the movement of fixing film 35 in the y direction is mounted near both ends of stay 38 in the y direction.

The heater thermometer 62 is arranged in the −z direction of the heater unit 40 with the heat conducting member 49 interposed therebetween. For example, the heater thermometer 62 is a thermistor. The heater thermometer 62 is mounted and supported on the surface of the support member 36 in the −z direction. The temperature sensing element of the heater thermometer 62 contacts the heat conducting member 49 through a hole penetrating the support member 36 in the z direction. The heater thermometer 62 measures the temperature of the heater unit 40 via the heat conducting member 49.

The thermostat 68 is arranged similarly to the heater thermometer 62. The thermostat 68 is incorporated in an electric circuit described later. The thermostat 68 cuts off the power supply to the heating element set 45 when the temperature of the heater unit 40 detected via the heat conducting member 49 exceeds a predetermined temperature.

Figure 7:
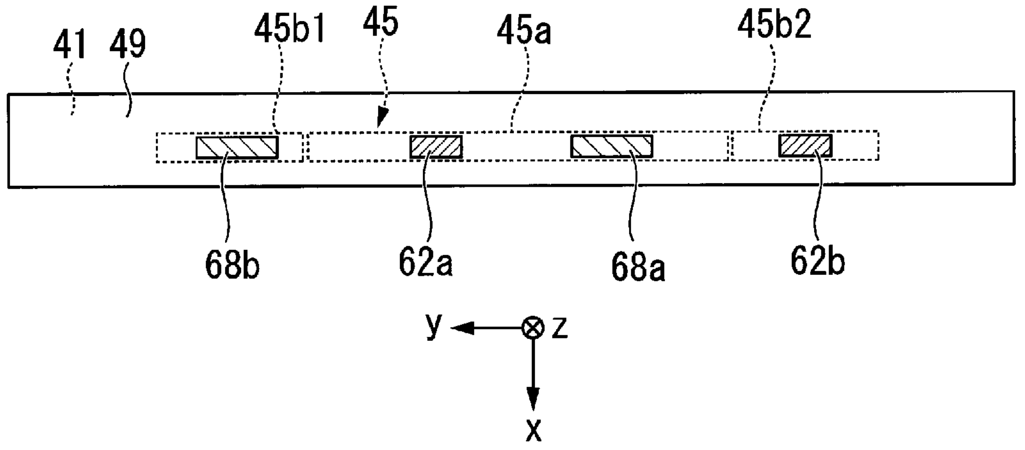
FIG. 7 is a plan view of a heater thermometer and a thermostat according to some embodiments.

FIG. 7 is a plan view (when viewed from the −z direction) of the heater thermometer and the thermostat. In FIG. 7, the description of the support member 36 is omitted. The following description regarding the arrangement of the heater thermometer 62, the thermostat 68, and the film thermometer 64 describes the arrangement of the respective temperature sensing elements.

A plurality of heater thermometers 62 (a central heater thermometer 62*a* and an end heater thermometer 62*b*) are arranged side by side in the y direction. The plurality of heater thermometers 62 are arranged within the range of the heating element set 45 in the y direction. The plurality of heater thermometers 62 are arranged at the center of the heating element set 45 in the x direction. That is, when viewed from the z direction, the plurality of heater thermometers 62 and the heating element set 45 are at least partially superimposed. A plurality of thermostats 68 (a central thermostat 68*a* and an end thermostat 68*b*) are also arranged in the same manner as the plurality of heater thermometers 62 described above.

The plurality of heater thermometers 62 include the central heater thermometer 62*a* and the end heater thermometer 62*b*. The central heater thermometer 62*a* measures the temperature of the central heating element 45*a*. The central heater thermometer 62*a* is arranged within the range of the central heating element 45*a*. That is, when viewed from the z direction, the central heater thermometer 62*a* and the central heating element 45*a* are superimposed.

The end heater thermometer 62*b* measures the temperature of the second end heating element 45*b*2. As described above, the first end heating element 45*b*1 and the second end heating element 45*b*2 are similarly controlled to generate heat. Therefore, the temperature of the first end heating element 45*b*1 is equal to the temperature of the second end heating element 45*b*2. The end heater thermometer 62*b* is arranged within the range of the second end heating element 45*b*2. That is, when viewed from the z direction, the end heater thermometer 62*b* and the second end heating element 45*b*2 are superimposed.

The plurality of thermostats 68 include the central thermostat 68*a* and the end thermostat 68*b*. The central thermostat 68*a* cuts off the power supply to the heating element set 45 when the temperature of the central heating element 45*a* exceeds a predetermined temperature. The central thermostat 68*a* is arranged within the range of the central heating element 45*a*. That is, when viewed from the z direction, the central thermostat 68*a* and the central heating element 45*a* are superimposed.

The end thermostat 68*b* cuts off the power supply to the heating element set 45 when the temperature of the first end heating element 45*b*1 exceeds a predetermined temperature. As described above, the first end heating element 45*b*1 and the second end heating element 45*b*2 are similarly controlled to generate heat. Therefore, the temperature of the first end heating element 45*b*1 is equal to the temperature of the second end heating element 45*b*2. The end thermostat 68*b* is arranged within the range of the first end heating element 45*b*1. That is, when viewed from the z direction, the end thermostat 68*b* and the first end heating element 45*b*1 are superimposed.

As described above, the central heater thermometer 62*a* and the central thermostat 68*a* are arranged within the range of the central heating element 45*a*. Thereby, the temperature of the central heating element 45*a* is measured. Further, when the temperature of the central heating element 45*a* exceeds a predetermined temperature, the power supply to the heating element set 45 is cut off. On the other hand, the end heater thermometer 62*b* and the end thermostat 68*b* are arranged within the range of the first end heating element 45*b*1 and the second end heating element 45*b*2. Thus, the temperatures of the first end heating element 45*b*1 and the second end heating element 45*b*2 are measured. Further, when the temperatures of the first end heating element 45*b*1 and the second end heating element 45*b*2 exceed a predetermined temperature, the power supply to the heating element set 45 is cut off.

The plurality of heater thermometers 62 and the plurality of thermostats 68 are alternately arranged along the y direction. As described above, the first end heating element 45*b*1 is arranged in the +y direction of the central heating element 45*a*. The end thermostat 68*b* is arranged within the range of the first end heating element 45*b*1. The central heater thermometer 62*a* is arranged in the +y direction from the center of the central heating element 45*a* in the y direction. The central thermostat 68*a* is arranged in the −y direction from the center of the central heating element 45*a* in the y direction. As described above, the second end heating element 45*b*2 is arranged in the −y direction of the central heating element 45*a*. The end heater thermometer 62*b* is arranged within the range of the second end heating element 45*b*2. As a result, the end thermostat 68*b*, the central heater thermometer 62*a*, the central thermostat 68*a*, and the end heater thermometer 62*b* are arranged side by side in this order from the +y direction to the −y direction.

Generally, the thermostat 68 utilizes the curved deformation of a bimetal along the temperature change to connect and disconnect the electric circuit. The thermostat is formed to be long and thin according to the shape of the bimetal. In addition, the terminals extend outward from both longitudinal ends of the thermostat 68. An external wiring connector is connected to this terminal by caulking. Therefore, it is necessary to secure a space outside the thermostat 68 in the longitudinal direction. Since the fixing device 30 does not have a spatial margin in the x direction, the longitudinal direction of the thermostat 68 is arranged along the y direction. At this time, if a plurality of thermostats 68 are arranged side by side in the y direction, it becomes difficult to secure a connection space for external wiring.

As described above, the plurality of heater thermometers 62 and the plurality of thermostats 68 are alternately arranged along the y direction. As a result, the heater thermometer 62 is arranged next to the thermostat 68 in the y direction. Therefore, a connection space for the external wiring to the thermostat 68 can be secured. Further, the degree of freedom of layout of the thermostat 68 and the heater thermometer 62 in the y direction is increased. As a result, the thermostat 68 and the heater thermometer 62 can be arranged at the optimum positions to control the temperature of the fixing device 30. Further, the AC wiring connected to the plurality of thermostats 68 and the DC wiring connected to the plurality of heater thermometers 62 are easily separated. Therefore, the generation of noise in the electric circuit is suppressed.

As shown in FIG. 3, the film thermometer 64 is arranged inside the fixing film 35 and in the +x direction of the heater unit 40. The film thermometer 64 contacts the inner peripheral surface of the fixing film 35 and measures the temperature of the fixing film 35. Hereinafter, the temperature detected by the film thermometer 64 will be referred to as "first detected temperature".

Figure 8:
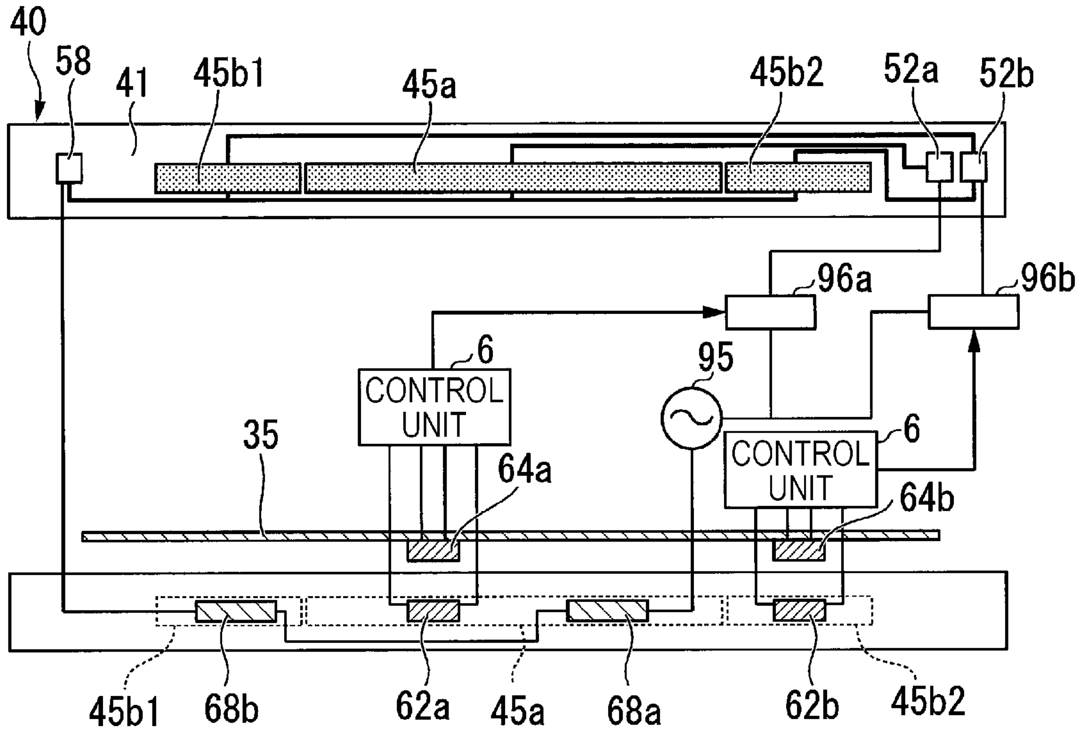
FIG. 8 is an electric circuit diagram of the heating device according to some embodiments.

FIG. 8 is an electric circuit diagram of the heating device according to the first embodiment. In FIG. 8, the bottom view of FIG. 5 is arranged on the upper side of the paper surface, and the plan view of FIG. 8 is arranged on the lower side of the paper surface. Further, in FIG. 8, the plurality of film thermometers 64 are shown above the lower plan view together with the cross section of the fixing film 35. The plurality of film thermometers 64 include a central film thermometer 64*a* and an end film thermometer 64*b*.

The central film thermometer 64*a* contacts the central portion of the fixing film 35 in the y direction. The central film thermometer 64*a* contacts the fixing film 35 within the range of the central heating element 45*a* in the y direction. The central film thermometer 64*a* measures the temperature of the central portion of the fixing film 35 in the y direction.

The end film thermometer 64*b* contacts the end of the fixing film 35 in the −y direction. The end film thermometer 64*b* contacts the fixing film 35 within the range of the second end heating element 45*b*2 in the y direction. The end film thermometer 64*b* measures the temperature of the end of the fixing film 35 in the −y direction. As described above, the first end heating element 45*b*1 and the second end heating element 45*b*2 are similarly controlled to generate heat. Therefore, the temperature of the −y direction end of the fixing film 35 is equal to the temperature of the +y direction end thereof.

A power supply 95 is connected to the central contact 52*a* via a central triac 96*a*. The power supply 95 is connected to the end contacts 52*b* via an end triac 96*b*. The controller 6 controls ON and OFF of the central triac 96*a* and the end triac 96*b* independently of each other.

When the controller 6 turns on the central triac 96*a*, the power supply 95 supplies the power to the central heating element 45*a*. As a result, the central heating element 45*a* generates heat. When the controller 6 turns on the end triac 96*b*, the power supply 95 supplies the power to the first end heating element 45*b*1 and the second end heating element 45*b*2. As a result, the first end heating element 45*b*1 and the second end heating element 45*b*2 generate heat. As described above, the central heating element 45*a*, and the first end heating element 45*b*1 and the second end heating element 45*b*2 are controlled to generate heat independently of each other. The central heating element 45*a*, the first end heating element 45*b*1 and the second end heating element 45*b*2 are connected in parallel to the power supply 95.

The power supply 95 is connected to the common contact 58 via the central thermostat 68*a* and the end thermostat 68*b*. The central thermostat 68*a* and the end thermostat 68*b* are connected in series. When the temperature of the central heating element 45*a* rises abnormally, the temperature detected by the central thermostat 68*a* exceeds a predetermined temperature. At this time, the central thermostat 68*a* cuts off the power supply from the power supply 95 to the entire heating element set 45.

When the temperature of the first end heating element 45*b*1 rises abnormally, the temperature detected by the end thermostat 68*b* exceeds a predetermined temperature. At this time, the end thermostat 68*b* cuts off the power supply from the power supply 95 to the entire heating element set 45. As described above, the first end heating element 45*b*1 and the second end heating element 45*b*2 are similarly controlled to generate heat. Therefore, when the temperature of the second end heating element 45*b*2 rises abnormally, the temperature of the first end heating element 45*b*1 also rises similarly. Therefore, even when the temperature of the second end heating element 45*b*2 rises abnormally, the end thermostat 68*b* also cuts off the power supply from the power supply 95 to the entire heating element set 45.

The controller 6 measures the temperature of the central heating element 45*a* with the central heater thermometer 62*a*. The controller 6 measures the temperature of the second end heating element 45*b*2 with the end heater thermometer 62*b*. The temperature of the second end heating element 45*b*2 is equal to the temperature of the first end heating element 45*b*1. The controller 6 measures the temperature of the heating element set 45 with the heater thermometer 62 at the time of starting the fixing device 30 (at the time of warming up) and at the time of returning from the temporary suspension state (sleep state).

When the fixing device 30 starts up and returns from the temporary suspension state and the temperature of at least one of the central heating element 45*a* and the second end heating element 45*b*2 is lower than a predetermined temperature, the controller 6 heats the heating element set 45 for a short time. After that, the controller 6 starts the rotation of the pressure roller 30*p*. The heat generated by the heating element set 45 lowers the viscosity of the lubricant applied to the inner peripheral surface of the fixing film 35. Therefore, the slidability between the heater unit 40 and the fixing film 35 is ensured at the start of rotation of the pressure roller 30*p*.

The controller 6 measures the temperature of the central portion of the fixing film 35 in the y direction using the central film thermometer 64*a*. The controller 6 measures the temperature of the end of the fixing film 35 in the −y direction with the end film thermometer 64*b*. The temperature of the −y direction end of the fixing film 35 is equal to the temperature of the +y direction end of the fixing film 35. The controller 6 measures the temperature of the central portion and the end of the fixing film 35 in the y direction when the fixing device 30 is in operation.

The controller 6 controls the phase or the wavenumber of the electric power supplied to the heating element set 45 by the central triac 96*a* and the end triac 96*b*. The controller 6 controls the power supply to the central heating element 45*a* based on the temperature measurement result of the central portion of the fixing film 35 in the y direction. The controller 6 controls the power supply to the first end heating element 45*b*1 and the second end heating element 45*b*2 based on the temperature measurement result of the end of the fixing film 35 in the y direction.

Hereinafter, the configuration of the fixing film 35 will be described in detail. As described above, the fixing film 35 includes the base layer, the elastic layer, and the release layer in order from the inner peripheral side. For example, the base layer is made of polyimide. The surface resistivity measured from the inside of the fixing film 35 is, for example, a value in a range of 7 to 12 [LOG Ω/sq.]. The conductivity represented by the surface resistivity in this range is referred to as "slight conductivity" here. The measurement environment has a temperature of 23±3° C. and a humidity of 50±10%. A UR type probe may be used. The surface resistivity is obtained by measuring the electrical resistivity on the surface of the upper base layer with the base layer of the fixing film 35 facing upward and the release layer facing downward (base side of the measuring device). Here, the average value of the measured values at five points in the longitudinal direction was used as the measurement result of the surface resistivity. The probe was fixed at UR and the applied voltage was fixed at 500V. The reason why the probe and the applied voltage were fixed is that the resistance value of the slightly conductive region largely varies depending on the measuring device, the probe, and the applied voltage.

In addition, if none of the following cases apply, the heater unit 40, the fixing film 35, and the secondary parts adjacent to the fixing film 35 are required to have a certain withstand voltage.

- A case where the thickness of the insulating layer 43 or the protective layer 46 is 0.4 mm or more when the surface of the protective layer 46 covering the heating element set 45 and the inner surface of the fixing film 35 directly slide (for example, in the case of FIG. 4).
- A case where the insulating layer 43 slides on the inside of the fixing film 35 on the surface opposite to the side on which the heating element set 45 is printed (not shown).
- A case where an insulator of 0.4 mm or more is interposed between the protective layer 46 and the fixing film 35.

The withstand voltage of the fixing film 35 and the secondary parts needs to be about 3 kV for about 1 minute. If this condition is not satisfied, it is necessary to have a distance of at least about 2.4 mm between the fixing film 35 and the secondary parts. For the temperature sensor, in particular, a contact type thermistor that contacts the inside of the fixing film 35 is often used. Therefore, the temperature sensor is desired to have a withstand voltage of 3 kV for 1 minute. On the other hand, instead of the contact type thermistor, a method of measuring the temperature of the fixing film 35 with a non-contact type thermopile arranged outside the fixing film 35 can be considered. However, with this method, although it is not necessary to satisfy the conditions of the withstand voltage, the cost and space need to be sacrificed.

FIG. 9 is a table showing the results of measuring the withstand voltage of fixing films having different conductivity. This measurement was performed by applying a high voltage between both ends of a 15 mm long test piece cut out from the fixing film. The column of "determination result" in the drawing shows the determination result of whether or not each fixing film has the required withstand voltage. From the measurement results shown in FIG. 9, it was found that a fixing film having a surface resistivity of 7.05 [LOG Ω/sq.] or less has a low withstand voltage of 3.8 [kV] or less. Further, it was found that a fixing film having a surface resistivity of 8.37 [LOG Ω/sq.] or more has a high withstand voltage of 9 [kV] or more. From such measurement results, in order to satisfy the required withstand voltage (about 3 kV), it is understood that the fixing film 35 only needs to have a surface resistivity of at least 7.05 [LOG Ω/sq.].

FIG. 10 is a table showing the results of measuring the static electricity amount in the film surface of fixing films having different conductivity. This measurement was performed by averaging the surface static electricity amounts measured at five points in the longitudinal direction for each fixing film in which the charge amount was saturated. Here, the fixing device using the fixing film to be measured is mounted on the multifunction peripheral (MPF), and the surface static electricity amount of the fixing film is saturated by heating and driving the automatic duplex unit (ADU) for 10 minutes with the ADU open. Further, the amount of static electricity was measured in a state where the probe tip of the measuring device was brought close to the surface of the fixing belt where the charge amount was saturated to about 5 cm. The measurement value of the static electricity amount at each point was the maximum value of the static electricity amount measured for 10 seconds.

In addition, this measurement is preferably performed in a low humidity environment where static electricity is easily generated. Therefore, the measurement was performed here in an environment of a temperature of about 10° C., and a humidity of about 20%. The column of "determination result" in the drawing shows the determination result of whether or not each fixing film has the required non-chargeability. From the measurement results shown in FIG. 10, it was found that if the fixing films have a surface resistivity of 9.87 [LOG Ω/sq.] or less, a surface static electricity amount is approximately 0 [kV].

On the other hand, the fixing film having a surface resistivity of 12.51 [LOG Ω/sq.] also had a low level of a surface static electricity amount of 1.18 [kV], and the fixing condition of the image was also good. However, in this case, noise due to the static electricity was generated from the vicinity of the nip when the fixing film was rotated. In this case, the static electricity generated in the fixing film may leak to the substrate 41 and the substrate 41 may be damaged. Therefore, there is a possibility that the fixing film in this case does not have sufficient non-chargeability.

It was confirmed that the fixing film having a surface resistivity of 15 [LOG Ω/sq.] or more produces a loud noise due to the static electricity and the fixed image was also disturbed by the static electricity (generally referred to as "electrostatic offset"). From these results, it is understood that the surface resistivity of the fixing film only needs to be about 10 [LOG Ω/sq.] or less from the viewpoint of non-chargeability. In addition, the description of (OK) in the determination result indicates that it may be determined as OK from the viewpoint of facilitating adjustment or may be determined as NG for safety.

For this reason, the fixing device 30 according to the first embodiment is configured using the fixing film 35 in which the surface resistivity measured from the base layer side is 7 to 10 [LOG Ω/sq.]. According to the fixing film 35 configured as described above, it is possible to achieve both the suppression of the charging of the fixing film 35 and the securing of the withstand voltage of the secondary parts of the fixing film 35, and the heater unit 40.

Second Embodiment

In the first embodiment, the case where the base layer of the fixing film 35 is made slightly conductive is described. On the other hand, in the second embodiment, a case where a so-called polyimide solid material (hereinafter referred to as "PI solid material") is used for the base layer of the fixing film 35 will be described. The PI solid material is a material having non-conductivity. As described above, the fixing film 35 is configured by laminating the base layer, the elastic layer (elastic rubber), and the release layer (PFA tube) in this order from the tubular inside. More specifically, a primer layer is provided between the elastic rubber and the PFA tube in order to enhance the adhesion therebetween. In the second embodiment, the non-conductive PI solid material is used for the base layer but the conductivity of the elastic rubber, the PFA tube, or the primer is adjusted to achieve both the suppression of charging and the securing of the withstand voltage.

The adjustment of conductivity is realized by adjusting the amount of conductive material added to the elastic rubber, PFA tube, or primer. Here, first, the case of adjusting only the conductivity of the elastic rubber was examined. For example, a carbon-based conductive material is added to Si rubber and the material in which the surface resistivity thereof is adjusted to about 10 [LOG Ω/sq.] is used as the elastic rubber of the fixing film. In this case, the volume resistivity was about 14 [LOG Ω·cm] or more, which was about the same as the volume resistivity measured from the inside (base layer side) of a fixing film using a general PI as a base layer. Similarly, when the conductive material was added only to the primer or only to the PFA tube, the volume resistivity of the fixing film was about 14 [LOG Ω·cm] or more. FIG. 11 is a table showing a result of performing such conductivity adjustment with a plurality of patterns.

In the first embodiment, in order to suppress the charging of the fixing film by making the base layer slightly conductive, the surface resistivity of the fixing film was required to be about 10 [LOG Ω/sq.] or less. On the other hand, as shown in FIG. 11, it was found that the same effect can be obtained by adjusting the conductivity of the elastic rubber, PFA tube, or primer. Specifically, the static electricity amount on the surface of the fixing film could be suppressed to the same level as in the first embodiment.

Here, the layer thickness of the primer is as thin as several microns, and it is considered that the contribution rate to the above effect is lower than the contribution rates of the elastic rubber and the PFA tube. On the other hand, since the layer thickness of Si rubber is about 200 μm, it is considered that the contribution rate to the above effect is higher than the contribution rates of the PFA tube and the primer. Therefore, in consideration of cost and yield, it is desirable to add the conductive material only to the Si rubber and not add the conductive material to the primer and the PFA tube. Specifically, in the conductivity measurement test that obtained the measurement results shown in FIG. 11, it was found that it is desirable that the surface resistivity of the Si rubber be smaller than the surface resistivity of the PFA tube. Regarding the withstand voltage, the surface resistivity measured from the inside of the fixing film was able to be within the allowable range of about 12 to 15 [LOG Ω/sq.]. In other words, this means that there is no problem even if a high voltage is applied to the fixing film 35. The description of (OK) in the determination result indicates that it may be determined to be OK from the viewpoint of facilitating adjustment or may be determined to be NG for safety.

As described above, when adjusting the conductivity of the elastic layer, the primer layer, or the release layer, a sufficient margin can be taken for the withstand voltage. For this reason, the fixing film 35 according to the second embodiment is made slightly conductive so that at least one of the elastic layer, the primer layer, and the release layer satisfies the following condition. The condition is that the surface resistivity measured from the base layer side of the fixing film 35 is 12 [LOG Ω/sq.].

Generally, since PI is often provided as a solid material, adjusting the resistance value is expensive. However, in the fixing film 35 according to the second embodiment, it only needs to adjust the resistance values of layers other than the base layer, and there is a sufficient margin in the withstand voltage. Therefore, according to the fixing film 35 of the second embodiment, even though the PI solid material is used for the base layer, both the suppression of the charging of the fixing belt and the securing of the withstand voltage of the secondary parts of the fixing belt and the heater can be more easily achieved at a lower cost.

Modification

In the first and second embodiments, the configuration of the fixing film is described by taking the so-called on-demand type fixing device 30 as an example of the fixing device. The on-demand type fixing device is a fixing device in which a heater unit is provided in a nip portion formed by a fixing belt and a pressure roller. In the above embodiments, the fixing film 35 is shown as an example of the fixing belt of such an on-demand type fixing device. However, the fixing belt according to the present embodiment is not limited to the fixing belt of the on-demand type fixing device.

For example, the fixing belt according to the present embodiment can be applied to a fixing device in which a heater directly heats the fixing belt. Generally, this type of fixing device includes a fixing belt, a pressure roller, a heating unit, and a reflecting unit (reflector). In this case, the fixing belt is driven by the pressure roller, and a heating element such as a halogen lamp is arranged inside the fixing belt as a heating unit. The reflecting unit is arranged inside the fixing belt similarly to the heating unit and reflects the heat generated by the heating unit toward the fixing belt. The fixing belt is heated by the heat collected by the reflecting unit (for example, see JP-A-2019-124714). That is, in this type of fixing device, the fixing belt and the heating unit are arranged in non-contact with each other.

Further, for example, the fixing belt according to the present embodiment can be applied to a roller fixing type fixing device. Generally, a roller fixing type fixing device includes a fixing belt, an elastic fixing roller, and a heat roller. In this case, the fixing belt is stretched by the elastic fixing roller and the heat roller and is rotated by driving the elastic fixing roller or the heat roller. The heat roller includes a heating element such as a halogen lamp therein and heats the fixing belt by the heat (for example, see JP-A-2018-146895). The roller fixing type fixing device may include a fixing pressure pad that presses the fixing belt from the inside thereof against the heat roller. The fixing pressure pad may be a glass cloth containing a fluororesin, on which fluorine-based grease or the like is arranged as a sliding aid.

According to at least one embodiment described above, by including a fixing belt which is a tubular endless belt formed by laminating a base layer, an elastic layer, and a release layer in order from the inner peripheral side and is adjusted so that the surface resistivity measured from the base layer side is 7 [LOG Ω/sq.] or more and 10 [LOG Ω/sq.] or less, or a fixing belt which is a tubular endless belt formed by laminating a base layer, an elastic layer, a primer layer, and a release layer in this order from the inner peripheral side and is adjusted so that the volume resistivity measured from the base layer side is 14 [LOG Ω·cm] or more, it is possible to achieve both the suppression of the charging of the fixing belt and the securing of the withstand voltage of the secondary parts of the fixing belt, and the heater.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A fixing device comprising:

a fixing belt formed of a tubular film;

a heater configured to heat the fixing belt, the heater including an insulating layer;

a roller positioned such that the fixing belt extends between the roller the heater; and a heat conductor including a first portion in contact with the heater, a second portion out of contact with the heater, and a third portion in contact with the heater, the second portion extending between the first portion and the third portion, and the heat conductor being positioned such that the insulating layer of the heater extends between the fixing belt and the heat conductor to prevent the heat conductor from contacting the tubular film.

2. The fixing device of claim 1, wherein a resistance of the heat conductor is less than a resistance of the insulating layer.

3. The fixing device of claim 2, wherein the heat conductor is made of metal.

4. The fixing device of claim 3, wherein the heat conductor is made of copper.

5. The fixing device of claim 2, wherein the insulating layer is made of glass.

6. The fixing device of claim 1, wherein the insulating layer contacts an inner peripheral side of the fixing belt.

7. The fixing device of claim 1, wherein the heater includes a heating element and the insulating layer extends between the heating element and the heat conductor.

8. The fixing device of claim 7, wherein the insulating layer is a first insulating layer, and wherein the fixing device further includes a second insulating layer extending between the heating element and the fixing belt and contacting an inner peripheral surface of the fixing belt.

9. The fixing device of claim 1, wherein:

the heater includes a heating element;

the heater and the heat conductor extend longitudinally along a length of the fixing belt;

the second portion of the heat conductor has a first longitudinal end and a second longitudinal end; and the heating element is longitudinally positioned at least partially between the first longitudinal end and the second longitudinal end of the second portion.

10. The fixing device of claim 9, wherein the heating element is longitudinally positioned entirely between the first longitudinal end and the second longitudinal end of the second portion.

11. The fixing device of claim 10, wherein the heating element is a first heating element of a plurality of heating elements of the heater, and the plurality of heating elements are all longitudinally positioned entirely between the first longitudinal end and the second longitudinal end.

12. The fixing device of claim 1, wherein:

the heater includes a heating element; and the heat conductor defines a recess that faces the heating element.

13. The fixing device of claim 1, further comprising a support member coupled to the heat conductor and contacting an inner peripheral surface of the fixing belt, the heat conductor extending between the support member and the heater.

* * * * *